Figure 1:
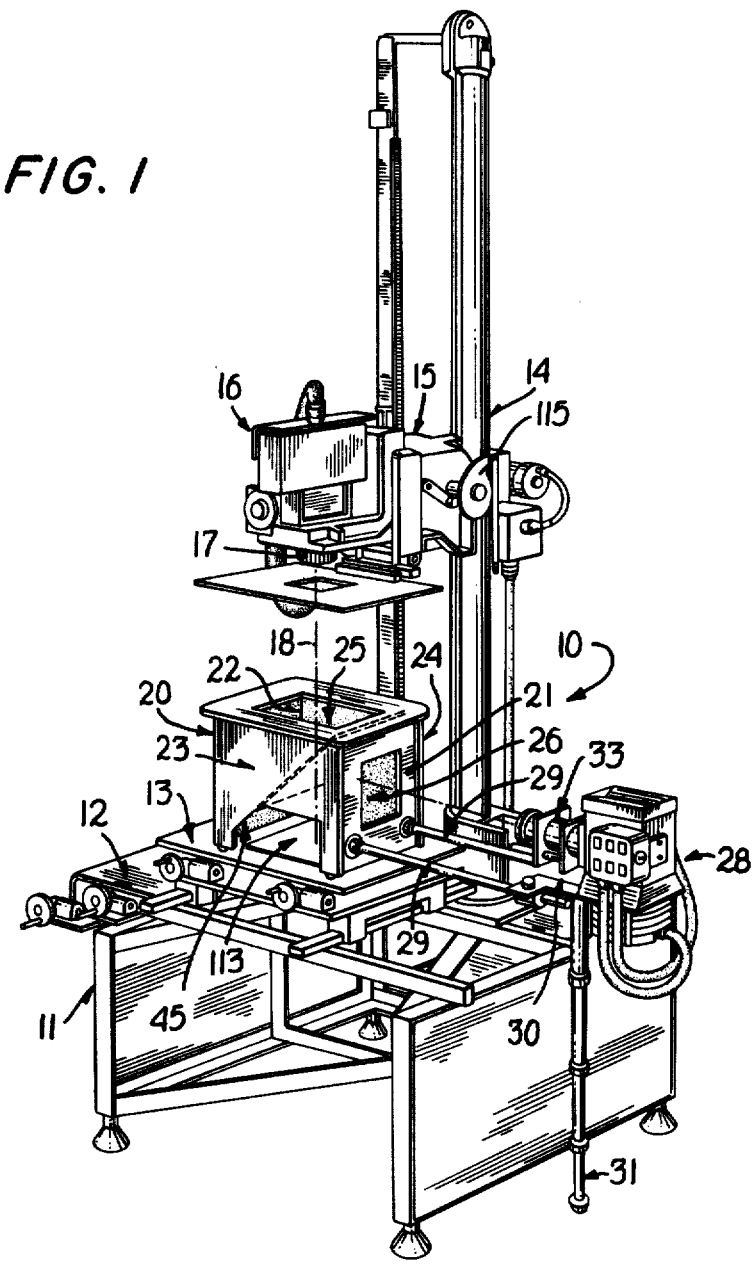

United States Patent [19]

Mathison

[11] 4,053,220

[45] Oct. 11, 1977

[54] APPARATUS FOR OPTICALLY COPYING SMALL FILM IMAGES WITH GOOD RESOLUTION

[75] Inventor: Paschal S. Mathison, New Rochelle, N.Y.

[73] Assignee: Photographic Equipment Service, Inc., New Rochelle, N.Y.

[21] Appl. No.: 660,035

[22] Filed: Feb. 20, 1976

[51] Int. Cl.$^2$ .................... G03B 13/28; G03B 27/70
[52] U.S. Cl. ........................................ 355/45; 355/65
[58] Field of Search ................ 353/28, 29, 37, 50; 355/18, 20, 43–46, 39, 53, 57, 60, 63–66, 77

[56] References Cited

U.S. PATENT DOCUMENTS

| | | | |
|---|---|---|---|
| 2,665,608 | 1/1954 | Clark | 353/28 |
| 2,727,427 | 12/1955 | Jenkins | 353/28 X |
| 2,857,806 | 10/1958 | Shuftan | 355/43 |
| 3,364,815 | 1/1968 | Smith et al. | 355/57 |
| 3,649,120 | 3/1972 | Pfeifer et al. | 355/63 X |
| 3,846,022 | 11/1974 | Kurhi | 355/53 |

FOREIGN PATENT DOCUMENTS

| | | | |
|---|---|---|---|
| 210,545 | 2/1956 | Australia | 353/37 |
| 720,756 | 11/1965 | Canada | 353/37 |
| 326,527 | 9/1920 | Germany | 355/43 |

*Primary Examiner*—Donald A. Griffin
*Attorney, Agent, or Firm*—Watson, Leavenworth, Kelton & Taggart

[57] ABSTRACT

Apparatus for optically copying to a desired scale with good resolution reproductions of small film images. Includes the equivalent of a filmstrip/slide or animation stand apparatus, a reproducing camera mounted upon an upright track support for elevational adjustment and having the axis of its focally adjustable lens and its gate arranged substantially downward, and a lateral tabletop supported below the camera lens for interception of the axis of the latter thereby. Means define an internal chamber which has a lateral bottom wall and an entrance upright sidewall with a top portion of this means having a large opening down through which the axis of the reproducing camera lens extends to the top face of the bottom wall and with the entrance wall having a beam entrance window. Means provide the top face of the bottom wall with a screen surface upon which an image bearing beam may be projected to form an image for photographic transfer upwardly into the reproducing camera, and means supports a projector with the optical axis of its gate and projecting lens arranged substantially laterally and extending through the beam entrance window into the chamber.

An oblique transparent mirror is mounted in the chamber behind the entrance window and is canted forward toward the latter sufficiently so that its reflective surface receives image bearing beams from the projector and reflects them downward to and upon the top face screen for reflection back upward through the transparent mirror and the top opening for reception by the camera; this transparent mirror being of good optical glass and of a thickness ($\leq$) one-eighth of an inch, (i.e., approximately equal to or less than one-eighth of an inch).

7 Claims, 3 Drawing Figures

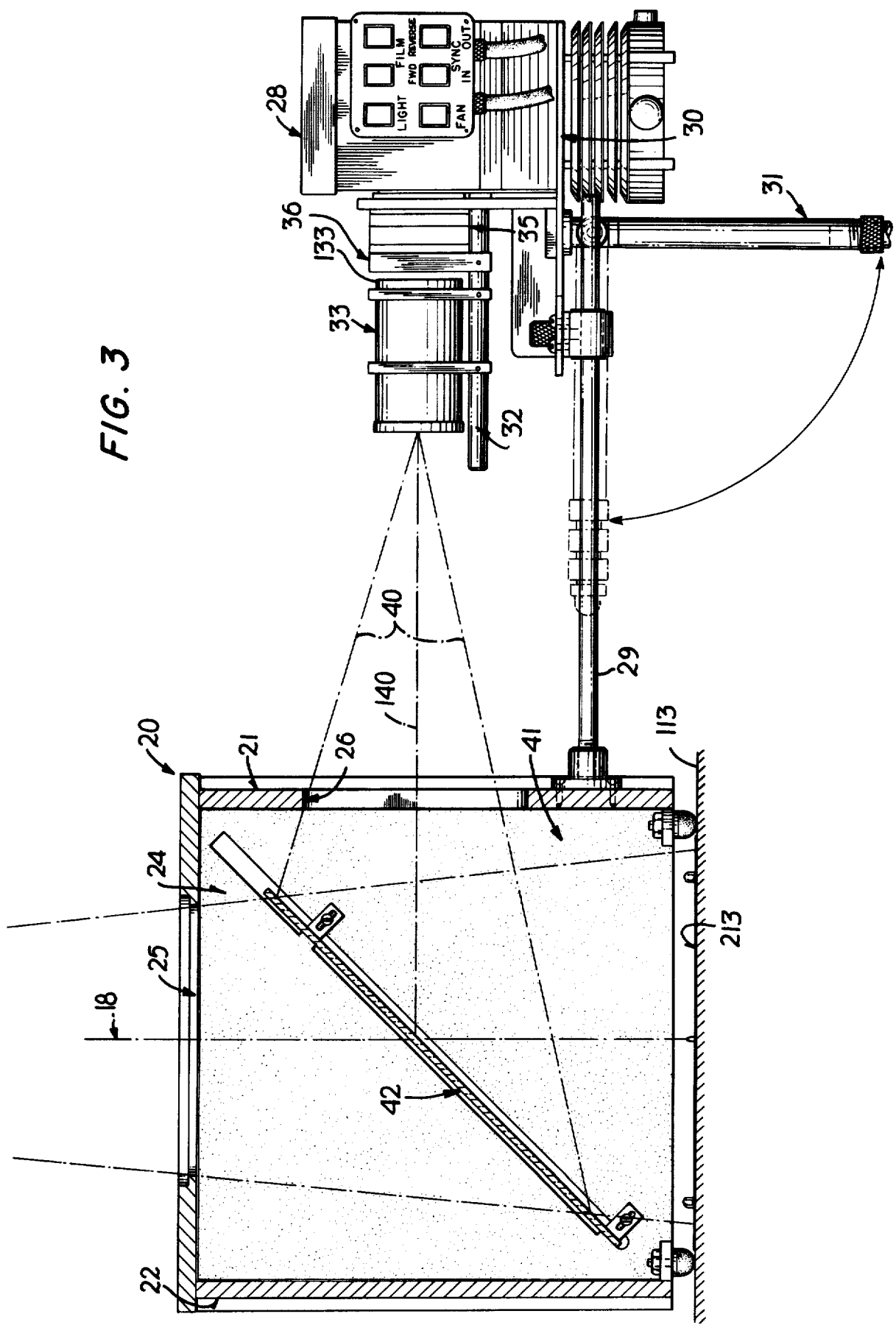

APPARATUS FOR OPTICALLY COPYING SMALL FILM IMAGES WITH GOOD RESOLUTION

BACKGROUND AND SUMMARY

The present invention relates to apparatus, such as filmstrip/slide or animation stand equipment, for optically copying to a desired scale with good resolution small film images which includes enlarging the images and then copying the latter or variants thereof by a reproducing camera at a small ratio focusing distance or greater.

Such stand apparatuses are employed photographically to reproduce photograph images or artwork composed of desired variants of the latter or other optical compositions, and such artwork may, for example, have a width size range varying from about three to thirty-five inches (±3 –35inches). Usually these stands characteristically include camming mechanisms for adjusting automatically the focuses of the lenses of reproducing cameras mounted thereon with axes of their aligned lenses and gates arranged substantially vertically and directed downward to the lateral supporting tabletops thereof, the camera mountings being such as to allow ready vertical adjustments including zooming. Focal lengths of normal and special lenses for such reproducing cameras usually vary from about 25 mm to about 150 mm, and very few such stands are provided with specially designed lenses for copying small image areas or automatic focus cams for the latter since sharp focus becomes highly critical in the area of 1:1 and the thickness of the material being copied varies enough to require manual adjustments on many exposures. Also, sine a 1:1 lens is at a distance equal to its focal length it must be located very close to the copy material which interferes with the necessary handling of this material enough to require undesirable consumption of time. Consequently, for such productions practitioners in this art frequently resort to the use of separate costly special printers having special lenses and micrometer controls, while others attempt to do their small copy work by the use of special equipments of the following types that are objectionable for the reasons, among others, there indicated.

I. Enlarging technique includes the making of an enlargement from the small image of the film frame transparency and then copying the enlargement. This practice involves the problem of production of a final copy that lacks sharp definition since it was made from an intermediate copy and possibly with the use of further intervening copies with each such operation losing something as to the desired sharp definition.

II. Rear projection is employed by some to enlarge the small image of the film frame transparency in projecting this image upon the back of a light transmitting screen and copying this projected image from the front of this screen. This practice is objectionable since the beam of light carrying the image must be directed up from beneath the tabletop as the screen, which makes it difficult to use. Also, the reproducing camera receives a beam carrying the image which is desired to be reproduced and also images of all imperfections of the light transmitting screen, so that an even field of light is almost impossible to obtain thereby.

III. Aerial image printing apparatuses (which may be of the types described in the Oxberry U.S. Pat. Nos. 3,040,619 of June 26, 1962; and Oxberry et al. 3,682,540 of Aug. 8, 1972) may be employed to project through systems of lenses, condensers, and mirrors thereof images of the small film transparencies which are desired to be reproduced in the reproducing cameras. The only image that is observed by the camera is the resulting enlarged image and this may be considered to be a good system for resolution. However, a special lens is required for the camera and the latter must remain at a fixed position. Also, the camera cannot crop in on a section of the image and color correction is difficult. Further, this system is very costly and much more expensive than the costly special printers that are employed by some technicians in this art.

IV. Others have suggested the use of a front projection system for this purpose, but in such a system the projector is positioned adjacent to and alongside of the reproducing camera with the axis of the path of its projection beam being as parallel as is possible to the axis of the beam path extending back to the camera lens and gate. Such a system is used primarily in a horizontal position while advantageously filmstrip/slide and animation stand equipments operate in a vertical mode, and this "front projection" system is not only costly, but demands an unusually or undesirably large amount of space.

V. Magnifying systems have been tried in each of which a magnifying lens is placed over each small film frame image to enlarge it for reproduction thereof by the reproducing camera. Such efforts have been unsuccessful since the results obtainable do not measure up to the professional standard demanded.

A general object of the present invention is to provide an economically produced apparatus to be employed reliably with standardized equipment normally available in the art of optically copying to desired scale reproductions or intended and desired variants of small film images while attaining good resolution and excellent color reproduction or correction in the copies.

Another object of the invention is to provide such equipment which may be easily employed to advantage with filmstrip/slide or animation stand apparatuses that can be existing standard equipment in the operator's plant so as to require little additional investment and simple and rapid installation while requiring no great skill to set up for use.

An additional object of the invention is to provide in a simple manner and allow easy and reliable use for producing desired art work including altering, color correcting and accomplishing special optical effects in the otherwise usual copy producing procedure.

A further object of the invention is to provide such supplemental and relatively low cost and easily used equipment which allows either of a filmstrip/slide stand or an animation stand as an optical printer for the production of motion picture film.

Briefly, apparatus of the present invention includes in combination with an equivalent of a filmstrip/slide or animation stand apparatus, a reproducing camera mounted upon an upright track support for elevational adjustment and having an axis of its focally adjustable lens and its gate arranged substantially downward, and a lateral tabletop supported below the camera lens for interception of the axis of the latter thereby. Means define an internal chamber which has a lateral bottom wall and an entrance upright sidewall with a top portion of this means having a relatively large opening down through which the axis of the reproducing camera lens extends to the top face of the bottom wall and with the entrance wall having a beam entrance window. Means also provide the top face of the bottom wall with a screen surface upon which an image bearing beam may be projected to form an image of good quality for photographic transfer upwardly into the reproducing camera, and means support a projector with the optical axis of its gate and projecting lens arranged substantially laterally and extending through the beam entrance window into the chamber. An oblique transparent mirror is mounted in the chamber behind the entrance window and its canted forward toward the latter sufficiently so that its reflective surface receives image bearing beams from the projector and reflects them downward to and upon the top face screen for reflection back upward through the transparent mirror and the top opening for reception by the camera; this transparent mirror being of good optical glass or equivalent material and of a thickness ($\leq$) one-eighth of an inch, (i.e., approximately equal to or less than one-eighth of an inch). The reflective coating of this transparent mirror is of a character whereby the ratio of light rays transmission to light rays reflection thereby desirably may be in the range of about 60:40 to 40:60, and the inner surfaces of the walls of the chamber structure except the bottom screen surface are of a character whereby they are effectively absorptive of the transmitted rays.

Figure 2:
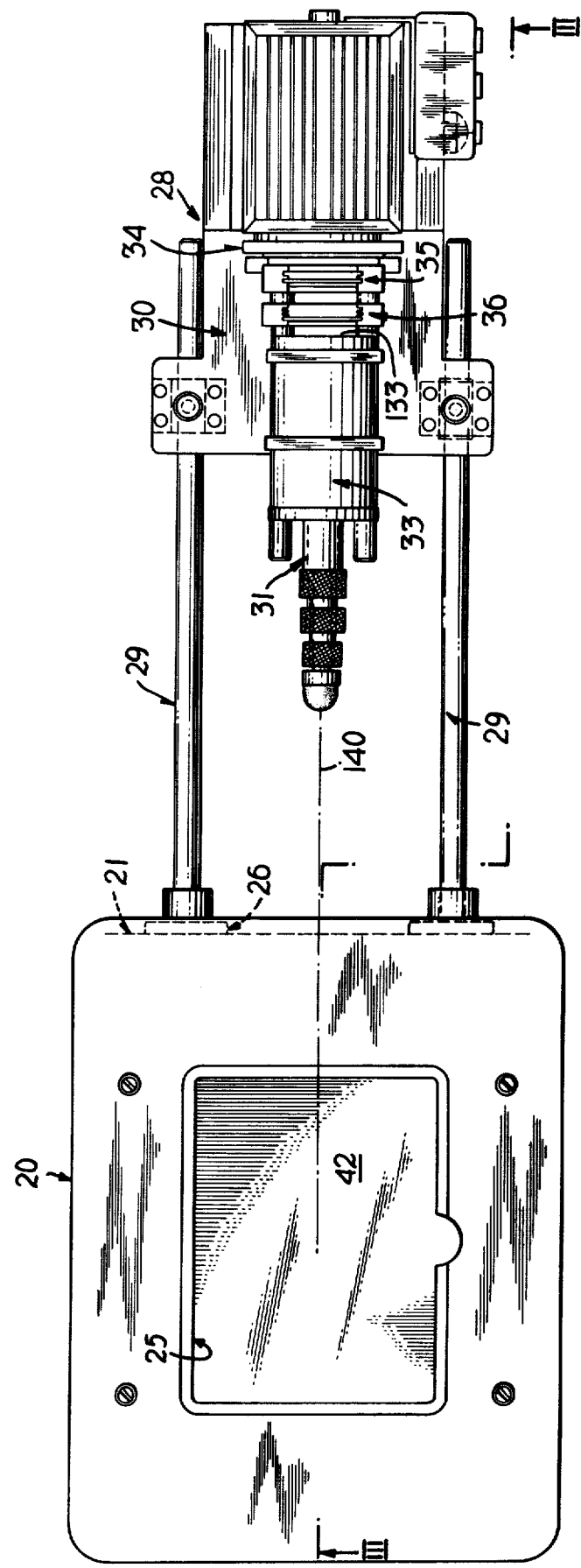

Other objects of the invention will in part be obvious and will in part appear from reference to the following detailed description taken in connection with the accompanying drawings, wherein like numerals identify similar parts throughout, and in which:

FIG. 1 is an elevational perspective of a simplified form of standardized animation stand which is equipped with an elevationally adjustable reproducing camera vertically mounted upon an upright track support or column and including a lateral tabletop supported below the camera lens, this view showing the tabletop supporting an internal chamber structure of the present invention with which is associated a projector;

FIG. 2 is a top plan view to larger scale of the internal chamber structure and associated projector which is added in accordance with the present invention to the conventional animation stand apparatus shown in FIG. 1; and FIG. 3 is a side elevational and vertical sectional view taken substantially on line III—III of FIG. 2.

It will be seen from FIG. 1 that the animation stand apparatus 10 includes a base frame structure 11 having a lateral top 12 on which is supported a conventional lateral table 13 that is, in the usual manner, manually adjustable in N-S and E-W directions. The animation stand base structure 11 is equipped with a standard upright column 14 which in turn supports for vertical travel, upwardly and downwardly, a camera carriage 15.

The camera carriage 15 supports in a conventional manner a suitable camera 16 equipped with a focally adjustable lens 17 having its axis and that of the camera gate thereabove (such as that indicated at 18) extending vertically down to interception by the tabletop 13. With elevational adjustment of the camera 16 the focal length of the lens 17 is automatically adjustable in a conventional manner in such equipment. For example, the column 14 may be provided with a vertical rack with which is meshed a pinion that will rotate therewith a cam, such as that indicated at 115, with the edge of the latter riding against the end of a lever arm to effect the focal adjustment.

In accordance with the present invention an internal chamber-defining structure 20 is rested upon the tabletop 13 and, as is illustrated in the present drawings, it may be in the form of a substantially rectangular box having an entrance upright sidewall 21, an opposed upright back wall 22, and a pair of transversely spaced sidewalls 23 and 24. The top portion of this chamber-defining box structure has a relatively large and laterally-oriented opening 25 therein down through which the axis 18 of the reproducing camera lens 17 extends to the top face 13 of the tabletop which constitutes the bottom of this box structure. The entrance upright sidewall 21 is provided with a beam entrance window opening 26.

While the bottom of the internal chamber-defining box structure may be provided with a lateral bottom wall connected to the upright sidewalls, it is preferred that the lateral tabletop 13, or a transparent insert section 113 thereof serve as such bottom wall structure. This tabletop insert 113 may then readily be provided with the desired means to serve as a top face screen for reflection of an image-bearing beam back upward through the top section of this internal chamber-defining box structure. Such screen may, as is indicated in FIG. 3, be and overlay sheet 213 of smooth grainless screen material.

This chamber-defining box structure 20 is supplemented by suitable means to support a projector 28 which may be in the form of a moving picture projector or, as is indicated in the drawings, a slide film projector. Such projector is provided with suitable supporting structure, which may be in the form of a pair of lateral rods 29, fixed to the entrance upright sidewall 21, and slidably supporting suitable projector base structure 30 vertically braced by a leg 31 of telescopic construction that can be extended and fixed in extended length for firm support of the projector. The projector 28 is equipped with suitable conventional means 32 to support a good quality lens 33 which has a sharp flat field resolution and good color transmitting characteristics, to project a good sharp image to the screen surface 213. Since the projector 28 is illustrated in the drawings is of the slide film type it will be noted from FIG. 2 that between the entrance end 133 of the lens and the gate location 34 of the projector a suitable open top chamber means 35 is provided whereby opposed vertical channels in the sidees thereof will receive the edges of one or more film slides. Between such film slide support structure 35 and the entrance end 133 of the lens a similar unit 36 may be provided to support one or more drop-in filters that may be desired.

The image bearing beam, illustrated at 40 in FIG. 3, enters the entrance window 26 into the chamber 41 defined by the sidewalls and the top section of the inverted box structure 20, to impinge upon the opposed oblique surface of a transparent mirror 42 (FIG. 3). Such oblique mirror will be opposed to the axis of the oncoming, image-bearing beam 40 at an angle of about forty-five degrees (45°) to the axis 140 of this beam for turning it substantially at right angles to impinge down upon the screen surface 213. This transparent mirror may have its reflective surface either as the front surface or the second surface. It will be seen from FIG. 3 that the transparent mirror 42 is canted obliquely forward toward the entrance window 26 so that its reflective surface is arranged at an acute angle to the bottom lateral screen surface 213 with the beam entrance window located in this angle whereby this reflective surface receives image bearing beams from the projector 28 and reflects them in focus downward to and upon the top face of the screen for reflection of the in-focus images back upward through the transparent mirror and the top opening 25 for reception by the camera 16. This transparent mirror is made from good optical glass, or other equivalent material, and will be in thickness approximately equal to or less than one-eighth of an inch (±3.175 mm). The ratio of rays transmission to rays reflection of this transmittor is to be in the range of about 60:40 to 40:60, and ideally may be about 50:50.

The rays of the beam 40 which are not reflected downwardly to the screen surface 213 are transmitted therethrough to impinge upon the inner surfaces of the walls of the interior chamber-defining box structure. In order that such reflected rays will not interfere with the transmission of a beam upward into the camera lens 17, along the path of the axis 18, such inner wall surfaces are ray absorptive and, for this purpose, may be covered by black fibrous sheeting or equivalent absorptive material.

In the use of this copying equipment the projector and the internal chamber-defining structure may first enlarge the small image of the film frame transparency to approximately nine by twelve inches (9 × 12 inches) on the screen and then project this enlarged image to the reproducing camera of the filmstrip/slide or animation stand apparatus back up through the transparent mirror and through the top opening, which may be about eight by ten inches (8 × 10 inches). The animation stand camera can easily maintain focus on this enlarged image at the screen. By way of example, this chamber-defining structure may be about twelve inches wide, fourteen inches high and fifteen inches long (±12 in. w. × 14 in. hi. × 15 in. l.). The film transparencies may be frames of conventional types of films, such as 35 mm, 16 mm or 8 mm.

As will be seen from FIG. 1 it may be desirable to provide the near upright sidewall 23 with a hand opening 45 so as to permit ready access to the reflective screen surface 213, so as to allow the placement of suitable mattes for blanking out certain image sections that are not to be reproduced on the reproduction camera film and for placement of filters on sectional areas of the image.

It will thus be seen that the objects set forth above, among those made apparent from the preceding description, are efficiently attained and, since certain changes may be made in the above construction with departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subjects matter defined in the following claims.

1. Apparatus for optically copying to a desired scale with good resolution reproductions of small film images, comprising, in combination with
   A. the equivalent of a filmstrip/slide or animation stand apparatus including a reproducing camera mounted upon an upright track support for elevational adjustment and having the axis of its focally adjustable lens and its gate arranged substantially downward, and a lateral tabletop supported below the camera lens for interception of the axis of the latter thereby, of
   1. means defining an in-focus, image-displaying internal chamber including a lateral bottom wall structure and an entrance upright sidewall with a top portion of said means having a large opening down through which the axis of the reproducing camera lens extends to the top face of the bottom wall structure and with the entrance wall having a beam entrance window;
   2. means providing the top face of said bottom wall structure with a screen surface upon which an image bearing beam may be projected for display thereon of an in-focus image for photographic transfer upwardly into the reproducing camera;
   3. means supporting a projector with the optical axis of its gate and projecting lens arranged substantially laterally and extending through the beam entrance window into said chamber; and
   4. an oblique transparent mirror mounted in said chamber behind said entrance window and canted obliquely forward toward the latter so that its reflective surface is arranged at an acute angle to the bottom lateral screen surface with the beam entrance window located in this angle whereby said reflective surface receives image bearing beams from said projector and reflects them in focus downward to and upon said top face of the screen for reflection of the in-focus images back upward through said transparent mirror and the top opening for reception by said camera;
   5. said transparent mirror being of good optical glass and of a thickness ($\leq$) one-eighth of an inch.

2. The optical copying apparatus of claim 1 characterized by the thickness of said transparent mirror being about one-eight of an inch (±3.175 mm).

3. The optical copying apparatus of claim 2 characterized by one of the internal chamber defining sidewalls having an access opening adjacent the screen surface through which an operator may reach to add to and/or subtract by masking from any composite image on the bottom surface screen selected image portions for altering the composite images that will be registered on film in said reproducing camera.

4. The optical copying apparatus of claim 1 characterized by the inner surfaces of the walls of the chamber structure except the bottom screen surface being ray absorptive.

5. The optical copying apparatus of claim 4 characterized by said inner wall surfaces except the bottom screen surface being ray absorptive black.

6. The optical copying apparatus of claim 1 characterized by said elevationally adjustable reproducing camera having associated therewith automatic means to keep its film gate in focus with respect to said screen surface in the elevational adjustment of said camera.

7. The optical copying apparatus of claim 1 characterized by the reflective coating of said transparent mirror having a ratio of rays transmission to rays reflection in the range of about 60:40 to 40:60.

* * * * *